April 11, 1961 H. KRAMER 2,979,119
WEB-TO-TUBE FASTENINGS
Filed Sept. 29, 1958 2 Sheets-Sheet 1

INVENTOR
HYMAN KRAMER
BY
ATTORNEY

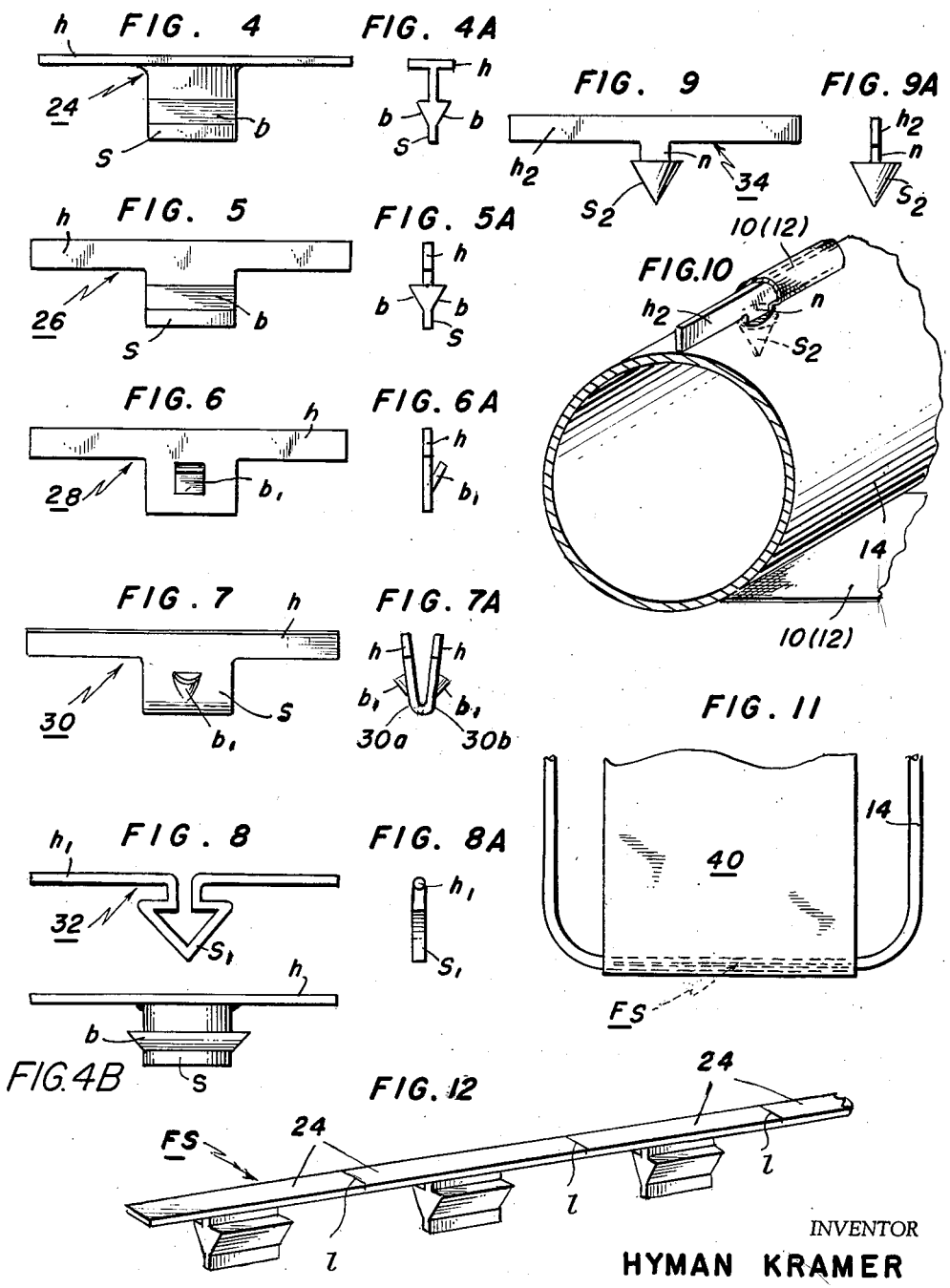

United States Patent Office 2,979,119
Patented Apr. 11, 1961

2,979,119

WEB-TO-TUBE FASTENINGS

Hyman Kramer, Brooklyn, N.Y.

Filed Sept. 29, 1958, Ser. No. 763,951

13 Claims. (Cl. 155—187)

This invention relates to improvements in web-to-tube fastenings, and more particularly although not exclusively to an improved fastening of the type employing a driven fastener which is especially useful in manufacturing tubular metal frame furniture, the present application for patent on the instant fastening being a continuation-in-part of my prior application Serial No. 721,233, filed March 13, 1958, also directed to web-to-tube fastenings employing a driven fastener element as the fastener component.

Continuing experience with the web-to-tube fastening disclosed and claimed in my aforesaid application revealed that, while functioning in thoroughly effective and satisfactory manner as a basic fastening, the preliminary operations of preparing the ends of the webbing strips to receive the fastening element and of applying the element to said ends, all prior to driving the fastener element into the tubing, increased manufacturing costs to a degree making the overall fastening suitable costwise to only the higher-price lines of tubular frame furniture. Therefore, it is a major object of the present invention to provide a web-to-tube fastening which retains the high operating efficiency and marked advantages of my prior fastening employing a driven fastener element as aforesaid, in respects to the security of attachment of the webbing strip, regardless of its taut or slack condition and of whether the strip has become stretched in use, and which in addition is substantially less expensive to apply than my prior fastening to a degree enabling the present improved fastening to compete costwise with all forms of web-to-tube fastenings of which I am presently aware.

A more particular object of the invention is the provision of an improved web-to-tube fastening for use in manufacturing tubular frame furniture and the like, which is characterized by the use of a driven fastener element constructed and arranged so that it may be simply applied to the ends of the webbing strips conventionally employed to form the back and seat panels of such furniture, thus to substantially reduce the overall cost of fastening the webbing strip ends to the tubular frame parts as compared to that employed in my prior application aforesaid.

Yet another object of the invention is the provision of various forms of driven fastener elements capable of being simply yet effectively applied to the ends of webbing strips preparatory to fastening the latter to the metal tubing of a furniture frame and which are furthermore adapted, when driven thereinto, to lock to the tubing in such manner as to effect a secure, permanent fastening of the webbing strips to the tubing regardless of the tautness hereof and/or of the webbing strips having lost their elasticity due to repeated use.

Still another object of the invention is the provision of a novel and highly effective fastener for fastening unitary fabric or plastic back and seat panels (as distinguished from interlaced webbing strips making up such backs or seats) to the tubular framing of conventional metal frame furniture.

A still further object of the invention is the provision of a fastener strip for use in fastening unitary fabric or plastic seat and back panels to the tubular framing of metal furniture as above, which is characterized by a multiple of individual driven fastener units arranged in tandem relation and connected end-to-end by a frangible-type connection, thus to make available to the furniture manufacturer a strip of fastener elements of any desired length, i.e. in length corresponding to the full width of the panels to be secured, and from which single or plural fastener elements may be broken off as needed.

The above and other objects and advantages of an improved web-to-tube fastening according to the present invention will more fully appear from the following detailed description thereof, taken with the accompanying illustrative drawings, wherein—

Figure 1:
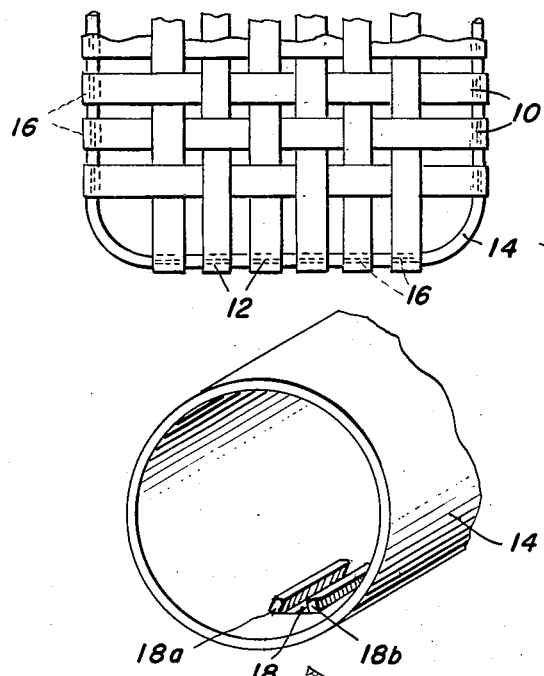
Fig. 1 is a fragmentary view of the seat (or back) of a piece of tubular frame furniture fashioned from interlaced fabric or plastic webbing strips secured at their ends to the tubular framing thereof.
Figure 3:
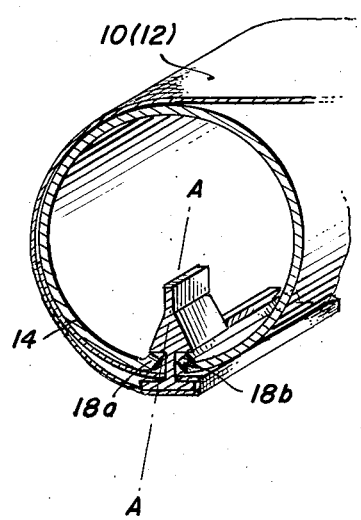
Fig. 3 is a sectional perspective view of a completed fastening of the invention which embodies the components illustrated in Fig. 2.

Figs. 4 and 4A, 5 and 5A, 6 and 6A, 7 and 7A, 8 and 8A, and 9 and 9A are side elevation and end views, respectively, of various forms of driven fastener elements for use in a fastening according to the invention;

Fig. 4B is a side elevation corresponding generally to Fig. 4 (and also to Fig. 5) which illustrates a slightly modified form of a fastener element of the invention utilizing the basic shank design of fastener element shown in said Figs. 4 and 5;

Fig. 10 is a sectional broken-away perspective view of a completed fastening employing a fastener element according to Figs. 9 and 9A, it being noted that the fastening is applied to a point on the circumference of the tubing which is spaced approximately 180° from that shown in Fig. 3;

Fig. 11 is a view similar to Fig. 1 but illustrating a fastening of the invention applied to metal frame furniture of the type wherein the seat and/or back is formed from a single fabric (or plastic) panel, rather than by interlaced strips of fabric or plastic webbing strip as in Fig. 1; and Fig. 12 is a broken-away perspective view illustrating a strip form of fastener element especially adapted to the fastening of seat and back panels as shown in Fig. 11 to the supporting tubing.

Referring to the drawings, Fig. 1 illustrates a form of improved fastening of the invention applied to secure the ends of interlaced webbing strips 10, 12 conventionally employed to make up the seat (or back) of a tubular metal chair or similar piece of furniture to the tubular framing 14 thereof, which latter, for convenience, is hereinafter referred to as the tubing. As will be understood, the webbing strips 10, 12 are usually made from fabric or plastic and they are shown to be secured at their ends to the under side or quadrant of the tubing, thus to have an approximate 180° of wrap around the same, although the point of securement of the strips to the arc of the tubing may vary substantially so long as there results an appreciable (i.e. 90°) wrap of the webbing strip-end about the tubing.

Figure 2:
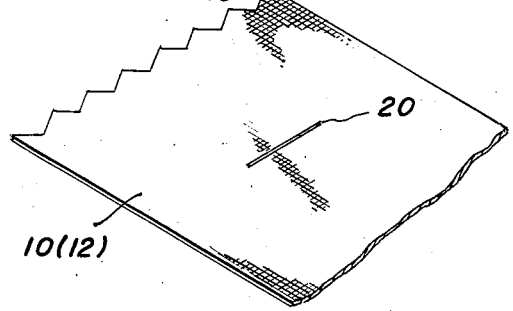
Fig. 2 is a separated view of the frame, webbing-strip end and fastener-element components making up one form of webbing strip fastening according to the invention.
Figure 2:
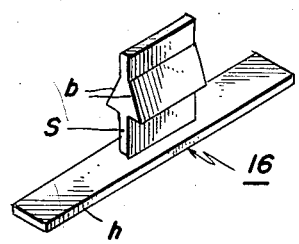

As will be seen from Figs. 2 and 3, a web-to-tube fastening as herein proposed employs as a component thereof a so-called driven, i.e., push-in rather than merely hook-in, fastener generally designated 16 which is approximately T-shape in front elevation, it being noted that in the aforesaid views the fasteners are inverted and thus have inverted T-shape. More particularly, a fastener 16 comprises an elongated bar-like head portion $h$ and a depending right-angular prong or shank portion $s$ of generally rectangular or blade-like section, and also having generally rectangular configuration as viewed in side elevation, except as hereinafter expressly noted. The width of said fastener head portion $h$ is not particularly critical and hence may vary substantially as will be hereinafter explained, but as seen in Fig. 2 its length is substantial, being only slightly less than the width of the webbing strips 10, 12 whereby it is adapted to extend substantially across same. On the other hand, the width of the shank $s$, i.e. its dimension corresponding to the length dimension of the head, while appreciable, is but a fraction of head length. The shank $s$ is further provided with a wedge-form barb or fluke $b$ extending edge-to-edge across at least one side face thereof, and preferably each side face of the shank is provided with such a barb or fluke, as illustrated, whereby the shank is shaped in its substantially medial portion as a double-faced wedge. In common with the fastener element disclosed in my prior application aforesaid, such a fastening 16 is intended to function as a driven fastener of the self-locking type. More particularly, the fastener shank $s$ is adapted to be forcibly driven into a slot-like opening 18 (Fig. 2) punched or otherwise provided therefor in the tubing 14, said opening having length slightly greater than the length of the shank and width somewhat less than the combined thickness of the shank and its flukes or barbs $b$. Also to be noted is that said flukes or barbs $b$ are disposed vertically of their shank a distance which is only slightly greater than the wall thickness of the tubing. Thus, when a fastener shank is driven into its opening 18 in the tubing, the fastener self-locks itself against removal therefrom by locking to the inner-wall side edges of said opening. Preferably, said opening side edges are shaped as converging lips $18a$, $18b$ so that they have a degree of resilience which facilitates passage of the fastener flukes $b$ through the mouth of the opening without detracting from the desirable self-locking action thereof. Also to be noted is that, by virtue of its close spacing from the fastener flukes, the under side of the fastener head is adapted to exert a hold-down force on a webbing strip extending thereunder, as will be later discussed.

Figs. 2 and 3 also illustrate the different manner of relating a driven fastener 16 to a webbing-strip end characterizing the present invention, as compared to that of my prior application aforesaid. That is to say, rather than the fastener being laid against a face of a webbing-strip end formed to a point and thereupon driven together with the end portion of the strip into the tubing 14, it is a feature of the present invention that the fastener 16 and the webbing-strip end to be secured thereby are related simply by passing the shank $s$ of the fastener through an opening 20 cut, punched or otherwise formed in the fastener-end portion, about an inch back from its terminal end edge, and thereupon folding the webbing-strip proper over the head portion $h$ of the fastener and the now folded-under end portion of the strip. Preferably, the aforesaid folding-over operation may be performed after the fastener shank, which has been previously inserted through the webbing strip opening 20, has been driven into its tubing opening 18, whereby no marring of the strip proper as might otherwise result from the driving operation is possible. The aforesaid set-back of opening 20 from the strip end-edge will of course depend upon the desired extent of wrap of said folded-under portion.

Fig. 3 illustrates several important aspects of the present fastening as follows: When load is applied to a webbing strip secured as illustrated, the folded-under portion of the webbing-strip end which wraps directly about the outer surface of the tubing is tightly held against said tubing by the overlying or overlap portion of the webbing strip, and thus a secure fastening is achieved as well as a very effective distribution of the applied load. The loading of the fastener strips may of course result in the fastener element tending to cock sidewardly, i.e. along broken line A—A, but if such occurs the resulting slight angling of the fastener actually increases its holding power since it results in the fastener head $h$ snugging to the tubing and thereby pressing the underlying portion of the webbing strip which it engages more tightly against the tubing and in the shoulder-like end of the fastener fluke $b$ on the side thereof towards which the fastener tends to lean engaging with increased force against the lip (illustratively the lip $18b$) of the corresponding side of the tubing opening 18, as adds to the security of the fastening as a whole. Also, since the fastener self-locks itself to the tubing, it cannot be easily dislodged therefrom as, for example, when load on the webbing strip which it secures is suddenly released or when the webbing strip has become slack due to loss of its elasticity from extended use. In short, the present fastening in nowise depends for its effectiveness on the tautness of its webbing strip as normally results from the load carried by the strip and/or its initially stretched condition.

As forecast above, a fastener suited to the purposes of this invention may take various forms. For example, the fastener element 24 shown in Figs. 4 and 4A (which corresponds to that shown in Figs. 2 and 3) is characterized by a head $h$ of appreciable width as compared to the thickness of its shank $s$, a feature which is best seen in Fig. 4A. On the other hand, the fastener head $h$ of the modified form of fastener designated 26 illustrated in Figs. 5 and 5A has the same thickness as the shank proper $s$ of the fastener, a feature which will be readily seen from Fig. 5A. As best seen in Figs. 4A and 5A, the flukes or barbs $b$ provide upwardly-laterally inclined formations on the shank faces which progressively increase the effective thickness of the fastener shank portion to in excess of the normal width of the frame member opening 18 (Figs. 2 and 3), which formations terminate at their upper or fastener-head ends in abrupt locking shoulders which are spaced from the under side of the fastener head a distance corresponding substantially to the thickness of the frame-member wall defining said opening, including the thickness of the opening lips $18a$, $18b$ if such are provided. As also shown in Fig. 4B, the aforesaid flukes or barbs $b$ may extend across the shank ends as well as its side faces, whereby the shank is adapted to self-lock itself to the end edges or lips, as well as the long side edges or lips, of the tubing opening.

Whereas the Figs. 4 and 5 fasteners have form and configuration adapting them to be injection-molded from either metal or plastic material by the use of well known injection molding techniques, the fastener 28 illustrated in Figs. 6 and 6A may be formed as a simple stamping from sheet metal stock having the requisite gauge or thickness, with the single barb or fluke $b_1$ (corresponding to the aforesaid barbs or flukes $b$) being fashioned as by striking (or coining) same in a face of the fastener shank portion $s$. A similar but offset barb or fluke $b_1$ may also be formed to extend from the opposite face of the shank portion. In case of but the single struck-out barb or fluke $b_1$ being provided as illustrated, it will be understood that such inclines relatively upwardly-forwardly from the relatively front face of the fastener prong, i.e. the face thereof on the same side as the edge of the fastener edge portion about which the webbing-strip end folds as aforesaid, and thus on the side towards which the fastener tends to lean as the webbing strip is tensioned, all as previously explained. It will also be understood that the free, relatively upper end of the barb $b_1$ defines the aforesaid locking shoulder which engages beneath the side lip or side wall of the frame-member opening 18.

Figs. 7 and 7A illustrate a variant fastener generally designated 30 which may also be stamped from sheet metal as described in connection with the Figs. 6 and 6A form of fastener. As shown, the Figs. 7 and 7A form of fastener are made up of two T-shaped fastener blanks 30a, 30b (one upright and one inverted), integrally connected along the common bottom line of their shanks and thereupon folded back on one another to the extent that the fastener is substantially V-shaped when viewed from an end as in Fig. 7A. Consequent to its V-formation, the Fig. 7 form of fastener is somewhat resilient in a direction transversely of its length, a feature which not only facilitates its being driven into its tubing opening but also enhances its locking action when finally assembled in its tubing.

It is also possible to construct satisfactory fastener elements for use in a fastening according to the invention from relatively stiff wire, either round or square. Referring to Figs. 8 and 8A, illustrating one such wire fastener element 32, it will be seen that the fastener head $h_1$ is composed of the two end portions of a length of stiff wire which are arranged to extend substantially coaxially, and that the shank portion $s_1$ thereof is formed by bending the intermediate portion of said wire so that it depends vertically therefrom and terminates in an arrow-head configuration, thus having the general form of a driving shank provided with end flukes as aforesaid, by which latter said shank is adapted to self-lock itself to the short ends or lips of the tubing opening as suggested above in connection with the Figs. 4 and 5 forms of fastener.

For certain applications, the shank portion of the fastener, rather than having rectangular section and sideface configuration featuring the Figs. 4–7A forms of fastener element in particular, may instead be formed with a driving and locking end or tip shaped as an inverted cone, as characterizes the Figs. 9 and 9A form of fastener element designated 34. It will be seen that said conical tip $s_2$ is separated from the head portion $h_2$ of the fastener by a reduced connecting neck $n$ having vertical length such as to space the larger-diameter or base end of the conical tip downwardly from the under face of the head a distance slightly greater than the wall thickness of the tubing. In use of the modified conically-shanked fastener shown in Figs. 9 and 9A, the tubing 14 will be preferably provided with a round opening 18r of diameter somewhat less than that of the larger-diameter end of the conical tip $s_2$ whereby the latter must be forcibly driven into the tubing end and, when so driven, self-locks itself thereto by engagement of the well defined shoulder between the tip and the reduced neck $n$ which connects said tip to the fastener head $h_2$. Of course, rather than the opening or hole 18a being full-circular, it may be made part-circular or even oval so long as the final shaping is such that the aforesaid conically-tipped shank will lock therewith.

According to a further important feature of the invention, fasteners of any one of the above described forms may be manufactured in strips of desired length, with each strip consisting of a multiple of fastener elements arranged in tandem relation and connected end-to-end by a frangible-type connection enabling one or a small number of the individual fastener elements to be broken away from the strip. Such a strip of fastener elements designated FS is shown in Fig. 12 wherein, for purposes of illustration, the strip is composed of a plurality of fasteners of the type illustrated in Figs. 4 and 4A arranged in tandem and with their head portions $h$ connected end-to-end but by means which permit ready separation of the fastener elements, one from the other, such as lines of weakness $l$ formed in the die-casting operation, for example, or by functionally equivalent lines of partial severance formed as by cutting partly through the head-forming strips at the required intervals.

A fastener strip FS is especially adapted to the fastening of unitary fabric or plastic seat panels (such as that indicated at 40 in Fig. 11) to the tubular metal frame of a chair or similar piece of furniture, which has heretofore required a multiplicity of individual fastening elements entirely separated from one another. As distinguished therefrom, when securing the fabric seat or back panel according to the present invention, a single strip FS of connected fastener elements of length corresponding to the full width of the panel may be employed in place of the individual disconnected elements, and accordingly the fastening of each edge of the fabric or plastic seat panel to the frame which is intended to support it is greatly facilitated. To provide for the strip-form of fastener as aforesaid, the tubing may be provided with a single elongated shank-receiving slot of length to accommodate all shanks $s$ of the connected fastener or with a plurality of smaller slots of length corresponding to the length of the shank of an individual fastener and which are spaced according to the spacing between the shanks of the connected fastener elements making up the strip.

As many changes could be made in carrying out the above constructions without departing from the scope of the invention, it is intended that all matter contained in the above description or shown in the accompanying drawings shall be interpreted as illustrative and not in a limiting sense.

I claim:

1. In tubular-frame furniture construction, a webbing-strip fastening assembly comprising the combination of a frame member having an opening in its wall shaped operatively to accept a fastener shank portion inserted therein, a webbing strip folded on itself adjacent its end so as to have overlying and folded-under end portions extending as a partial wrap about said frame member, and a fastener operatively securing said webbing-strip end to the frame member, said fastener having substantial T-configuration in front elevation and including an elongated bar-like head portion having length corresponding substantially to the width of the webbing strip and an integral prong-like shank portion extending from the middle length portion of said head portion and having width substantially less than the length of said head portion, said webbing strip being folded over the relatively forward longitudinal side edge of the head portion and said shank portion extending through both an opening in the folded-under end portion of the webbing strip and said elongated opening and thence well into the interior of said frame member, said shank portion having push fit in said opening and including integral locking means enabling said shank portion to self-lock itself and thereby the fastener and webbing-strip end to the frame member when pushed into said opening, said locking means comprising a relatively upwardly-forwardly inclined locking barb on at least the forward face of the shank portion and progressively increasing the effective thickness of the shank portion to in excess of the effective width of said opening, said barb terminating at its relatively upper end in an abrupt locking shoulder which is spaced from the under side of the head portion a distance substantially equaling the wall thickness of the frame member thereby to engage against the inside wall portion of the frame member defining said opening with increasing force as the webbing strip is tensioned.

2. A fastener assembly according to claim 1, wherein said locking barb comprises an area cut from the middle portion of the shank portion and the free upper-forward end of said barb defines said locking shoulder.

3. A fastening substantially as set forth in claim 1, wherein said locking barb comprises a wedge formation on the fastener shank portion.

4. A fastening substantially as set forth in claim 1, wherein said locking barb comprises wedge formations on the opposite sides of the fastener shank portion.

5. A fastening substantially as set forth in claim 1, wherein said fastener is fashioned from sheet metal and said locking barb is formed from the sheet material of the shank portion thereof and which inclines relatively forwardly-upwardly from said relatively forward face of the shank portion of whose free, upper-forward end defines said locking shoulder.

6. A fastening substantially as set forth in claim 1, wherein said fastener comprises identical T-shaped half sections integrally connected along their common bottom line and which are bent towards one another to the shape of a V, and wherein a locking barb is struck out from the material making up each of the vertical legs of the T-sections and which constitute the shank portion of the fastener, said barbs lockingly engaging beneath said side edges of the frame-member opening.

7. A fastening substantially as set forth in claim 1, wherein said fastener comprises a component of a fastener strip made up of a plurality of like fasteners arranged in tandem and whose elongated bar-like head portions are connected end-to-end.

8. A fastening substantially as set forth in claim 7, wherein the connections between the fastener components of the fastener strip are readily frangible.

9. For use in tubular-frame furniture construction, a fastener for securing the end of fabric webbing to a tubular frame member of said furniture comprising a fastener body having T-shape in front elevation and including an elongated bar-like head portion of length corresponding substantially to the width of said webbing and a substantially flat, blade-like shank portion extending substantially at a right angle from the intermediate length portion of said head portion, said shank portion having means extending laterally from the approximately medial portion of at least one side face thereof which is operative to snap beneath and lockingly engage with at least one edge of an opening provided in the wall of said tubular member to receive said shank upon its insertion in said opening, said laterally extending means comprises a relatively upwardly-forwardly inclined wedge formation extending across the width of said shank and the construction and arrangement being such that the fastener may be initially assembled to the webbing by passing the shank thereof through the webbing at a point set back from its end edge and then folding the end portion of the webbing beyond the fastener about the relatively forward longitudinal side edge of and beneath its head portion, and thereupon the webbing and fastener may be together secured to the tubular member simply by forcibly inserting the fastener shank into the opening of said member.

10. A fastener substantially as set forth in claim 9, wherein said fastener is fashioned from relatively rigid sheet metal.

11. A fastener substantially as set forth in claim 9, wherein said fastener is formed of two identical sheet-metal half-sections both having T-configuration and said half-sections are joined along a common edge corresponding to the bottom edge of the T.

12. A fastener substantially as set forth in claim 9, wherein laterally extending means as aforesaid are provided on both side faces of said shank portion.

13. A fastener substantially as set forth in claim 9, wherein laterally extending means as aforesaid are also provided on each of the end faces of said shank portion.

References Cited in the file of this patent

UNITED STATES PATENTS

| | | |
|---|---|---|
| 1,576,527 | McBride | Mar. 16, 1926 |
| 1,705,455 | Griffiths | Mar. 12, 1929 |
| 1,739,943 | Bolender | Dec. 17, 1929 |
| 2,184,783 | Tinnerman | Dec. 26, 1939 |
| 2,457,343 | Braunschweiger | Dec. 28, 1948 |
| 2,582,579 | Bedford | Jan. 15, 1952 |
| 2,622,663 | Burd | Dec. 23, 1952 |
| 2,757,719 | Duval | Aug. 7, 1956 |
| 2,796,647 | Bedford | June 25, 1957 |
| 2,817,392 | Thomas | Dec. 24, 1957 |
| 2,909,957 | Rapata | Oct. 27, 1959 |
| 2,937,696 | Arnold | May 24, 1960 |

FOREIGN PATENTS

| | | |
|---|---|---|
| 841,590 | France | Feb. 13, 1939 |